July 18, 1961  F. VACHA  2,992,868
MOUNTING SLEEVE
Filed May 7, 1958
Fig. 1
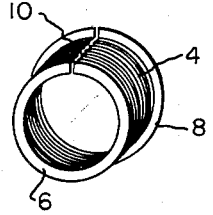
Fig. 2
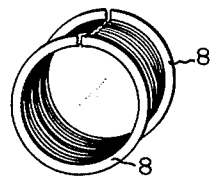
Fig. 4
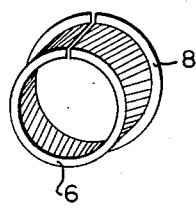
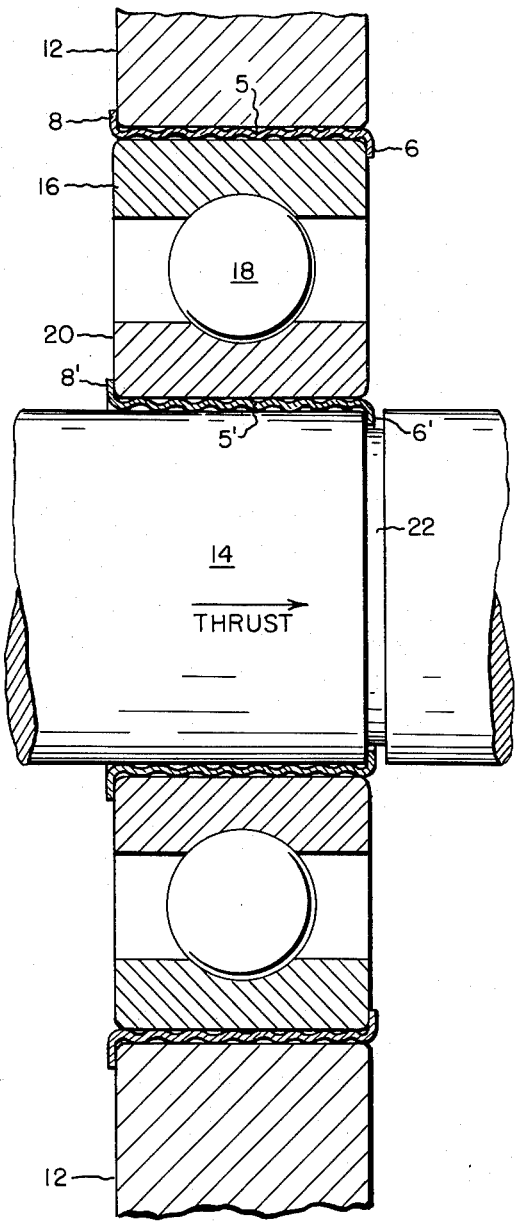
Fig. 3
INVENTOR.
FRED VACHA
BY KENWAY, JENNEY, WITTER & HILDRETH
ATTORNEYS

United States Patent Office 2,992,868
Patented July 18, 1961

2,992,868
MOUNTING SLEEVE
Fred Vacha, Babson Park 57, Needham, Mass.
Filed May 7, 1958, Ser. No. 733,755
6 Claims. (Cl. 308—236)

The present invention relates to shaft and bearing mounting sleeves and more particularly to a corrugated metal mounting sleeve.

One of the problems in the use of shafts is the problem of mounting objects on such shafts. The tolerances between the object to be mounted and the shaft itself must be exceedingly close. Where it is desirable to have the object rotate with the shaft, a rigid connection between the two is essential. On the other hand, it is often desirable to have the shaft rotate freely about its axis. In the latter case anti-friction bearings are needed.

The most common types of anti-friction bearings are ball and roller bearings. Bearings are normally held in place by an inner and an outer bearing race. The inner race must be firmly attached to the shaft so that no axial or lateral force will cause it to vary its path. The outer race is normally held in place by a housing. Numerous attempts have been made to provide a method of accurately mounting the inner race to the shaft and to hold the outer race accurately within the housing.

It has been necessary heretofore to keep all parts to very close tolerances in order to get a proper fit. Normally, the housing must be borized and the shaft must be precision ground. The ball bearings must be held to close tolerances. The outside diameter and inside diameter of the bearings must be held to close tolerances. Often it is necessary to resort to selective bearing assembly for optimum bearing fit. Since ball bearings with closer than commercial tolerances on the outside and inside diameters are costly, it is expensive to obtain the fit that is required. Also borizing or precision grinding is expensive.

Some of the attempts that have been made to overcome these problems have been to provide resilient mountings. The most common material that has been used has been rubber. A mounting of rubber or other resilient material is used between the housing and the outer race. While rubber is a partial aid, still all such resilient materials have a tendency to "cold flow" or to produce some other deformity after use. The result is that the outer race is no longer held in its proper position and wear and noise or both result.

Various attempts have been made to provide a metal supporting structure or shim. None of these are altogether satisfactory and all are expensive.

The principal object of the present invention is to provide a mounting sleeve that is superior to other types of mounting devices now in use, and eliminate the need for such machining operations as borizing of housing and grinding of shafts.

A further object is to provide a mounting sleeve that is simple and inexpensive yet provides for accurate, concentric location of an object on a shaft, irrespective of thermal expansion or contraction of the parts.

FIG. 1 is a schematic perspective view of a mounting sleeve according to the present invention having one internal and one external flange portion.

FIG. 2 is a schematic perspective view of a mounting sleeve having two external flange portions.

FIG. 3 is an elevation view in section showing a shaft mounting that employs the mounting sleeve of the present invention.

FIG. 4 is a schematic perspective view of a modified form of mounting sleeve, according to the present invention.

In FIG. 1 there is shown a mounting sleeve having an accurately formed annular wall with small circumferential corrugations 4 and provided with an internal end flange 6 and an external end flange 8. A longitudinal gap 10 is formed by a slot cut through the annular wall and both flanges.

The sleeve of FIG. 1 is preferably constructed by drawing a cup-shaped article and then cutting out a part of the bottom to form the flange 6. The external flange 8 may be formed in the drawing operation or by any suitable spinning or pressing operation. The cup is then embossed in a suitable embossing mold, preferably of the type using a rubber insert, to form the corrugations 4.

In FIG. 3, there is illustrated the employment of the mounting sleeve of the present invention for mounting a housing 12 to a shaft 14, which is designed to rotate in bearings. Two mounting sleeves of the type illustrated in FIG. 1 are used. The outer ball bearing race 16 is held in place within the mounting 12 by a mounting sleeve 5 having an external flange 8 seating against the housing and internal flange 6 to engage the race. The inner race 20 is held in place on the shaft 14 by a mounting sleeve 5' having its external flange portion bearing against the inner race, and its internal flange bearing against a shoulder formed by a circumferential groove 22 in the shaft. Assuming a thrust load to the right, this construction secures the bearing against the thrust, and also centers the bearing accurately with respect to the shaft axis. Since the mounting sleeves have a slight degree of radial flexibility, they maintain the races securely in place to ensure an accurate, concentric fit of the shaft 14, ball bearings 18 and the housings 12, with due allowance for thermal expansion or contraction of the mating parts. In this manner, the present invention makes it no longer necessary to go to great expense in grinding the surfaces of the shaft and housing or selective assembly of bearings to obtain an accurate fit. Such slight flexibility as exists is uniform and does not militate against precise positioning of the bearing.

The circumferential disposition of the corrugations resists distortion of the corrugations under radial load, as might occur with longitudinal corrugations. Thus, while a longitudinal corrugation might be crushed throughout its length, so that concentricity might be lost, the radial loading is distributed across all of the corrugations but across only a small part of the length of each corrugation.

The advantageous results of the present invention may be obtained, if desired, by corrugations which extend at an angle to the axis in helical paths, as for example, like screw threads, or as shown in FIG. 4, wherein each corrugation extends at an angle of about 15° to the longitudinal axis. In such a case the radial load is distributed across several corrugations.

The mounting sleeve may be manufactured from stock of any thickness desired and the corrugations may be as deep or shallow as necessary. Any slight discrepancy in the fit of the shaft is taken up by the mounting sleeve itself. As an example of preferred sizes, it has been found that for most ball bearings, corrugations having a depth of 0.005" and a spacing of $\frac{1}{16}$ to $\frac{1}{8}$ inch are satisfactory. Furthermore, mounting sleeves made out of phosphor bronze or beryllium copper or stainless steel, etc., eliminate the necessity of the steel liner frequently required in soft aluminum or zinc or plastic or other non-ferrous housing where expansion and contraction with temperature changes raise problems in proper ball bearing fits. With the present invention it is possible to maintain the proper ball bearing fit and alignment in service since the metallic mounting sleeve is not subject to cold-flow, as occurs in the use of resilient material such as rubber.

FIG. 2 shows another form of sleeve with two external flanges 8. This is illustrative of a variety of flange arrangements, since the sleeve may be formed with a single internal or external flange, or with two internal or two external flanges, or with one flange of each type as shown in FIG. 1.

While the present invention has been illustrated in specific embodiments, the utility of the present invention for mounting objects on shafts is at once apparent. I intend, therefore, not to be bound by the illustrations given but rather by the spirit of the present invention and the scope of the appended claims.

Having thus described the present invention, I claim:

1. In combination with a housing, a shaft having a circumferential shoulder and a bearing having inner and outer races, a supporting structure comprising two accurately formed cylindrical sleeves, each having corrugations extending in a direction at a substantial angle to the shaft axis and each having inwardly and outwardly extending flanges at the opposite ends thereof respectively, each sleeve having a gap extending in a generally longitudinal direction through said corrugations and flanges, one of said sleeves having its flanges engaging the housing and the outer race to prevent movement of the outer race in the housing in one direction along the shaft axis, the inner sleeve having its flanges engaging the inner race and said shoulder to prevent movement of the shaft in said direction, whereby the bearing and shaft are supported and the thrust load in said one direction is taken by said flanges, the corrugations having a slight radial flexibility to center the shaft and bearing accurately in the housing.

2. In combination with a shaft having a circumferential shoulder and a bearing having inner and outer races, a supporting structure comprising an accurately formed cylindrical sleeve having corrugations extending at a substantial angle to the axis of the shaft, the sleeve being formed with a small gap extending through its entire length in a generally longitudinal direction, the sleeve being provided at its opposite ends with annular flanges in planes perpendicular to the shaft axis, one flange extending radially inwardly of the sleeve and engaging said shoulder to prevent movement of the sleeve from the shaft in one direction along the shaft axis, and the other flange extending radially outwardly of the sleeve and engaging the inner race of the bearing to prevent movement of the bearing along the shaft in said direction, said flanges serving to position the bearing accurately on the shaft and to resist thrust loading, the corrugations providing a slight radial flexibility to center the bearing accurately on the shaft.

3. In combination a shaft, a housing, a bearing, a supporting structure comprising an accurately formed cylindrical sleeve having corrugations extending at a substantial angle to the axis of the shaft, the sleeve being formed with a small gap extending through the entire length of the sleeve in a generally longitudinal direction, the sleeve being received in the housing and being provided at its opposite ends with annular flanges in planes perpendicular to the shaft axis, one flange extending radially outwardly of the sleeve and engaging said housing to prevent movement of the sleeve relative to the housing in one direction along the shaft axis and the other flange extending radially inwardly of the sleeve and engaging the bearing to prevent movement of the bearing relative to the housing in said direction, said flanges serving to position the bearing accurately in the housing and to resist thrust loading of the bearing, the corrugations providing a slight radial flexibility to center the bearing accurately in the housing.

4. The combination according to claim 1 in which the corrugations extend in a substantially circumferential direction around the sleeves.

5. The combination according to claim 2 in which the corrugations extend in a substantially circumferential direction around the sleeve.

6. The combination according to claim 3 in which the corrugations extend in a substantially circumferential direction around the sleeve.

References Cited in the file of this patent

UNITED STATES PATENTS

| 1,590,181 | Brunner | June 29, 1926 |
| 2,324,676 | Butterfield | July 20, 1943 |
| 2,620,243 | Beatty | Dec. 2, 1952 |

FOREIGN PATENTS

| 168,666 | Great Britain | Sept. 5, 1921 |
| 726,836 | Great Britain | Mar. 23, 1955 |